(12) United States Patent
Kawahashi et al.

(10) Patent No.: US 9,327,996 B2
(45) Date of Patent: May 3, 2016

(54) METHOD FOR PRODUCING POSITIVE ELECTRODE ACTIVE MATERIAL FOR LITHIUM ION BATTERY AND POSITIVE ELECTRODE ACTIVE MATERIAL FOR LITHIUM ION BATTERY

(75) Inventors: Yasuhiro Kawahashi, Kitaibaraki (JP); Yoshio Kajiya, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 564 days.

(21) Appl. No.: 13/581,423

(22) PCT Filed: Aug. 24, 2011

(86) PCT No.: PCT/JP2011/069042
§ 371 (c)(1),
(2), (4) Date: Aug. 27, 2012

(87) PCT Pub. No.: WO2012/098724
PCT Pub. Date: Jul. 26, 2012

(65) Prior Publication Data
US 2012/0319037 A1    Dec. 20, 2012

(30) Foreign Application Priority Data

Jan. 21, 2011    (JP) ................ 2011-011014

(51) Int. Cl.
*C01G 53/00*    (2006.01)
*H01M 4/485*    (2010.01)
(Continued)

(52) U.S. Cl.
CPC ............. *C01G 53/44* (2013.01); *C01G 53/42* (2013.01); *C01G 53/66* (2013.01); *H01M 4/485* (2013.01);
(Continued)

(58) Field of Classification Search
CPC ........ C01G 53/42; C01G 53/44; C01G 53/66; C01G 45/02; C01P 2002/52; C01P 2002/54; C01P 2006/11; C01P 2006/40; H01M 4/485; H01M 4/505; H01M 4/525; H01M 4/50; Y02E 60/122; Y02P 70/54
USPC ............ 252/182.1; 429/223, 224, 221, 231.1, 429/231.3, 188, 523
See application file for complete search history.

(56) References Cited

U.S. PATENT DOCUMENTS 2,165,128 A    7/1939   Cheesman
4,443,186 A    4/1984   Shell
(Continued)

FOREIGN PATENT DOCUMENTS

CN    1520621 A    8/2004
CN    1701451 A    11/2005
(Continued)

OTHER PUBLICATIONS

International Preliminary Report on Patentability mailed Sep. 26, 2013 in co-pending PCT application No. PCT/JP2011/053271.
(Continued)

*Primary Examiner* — Milton I Cano
*Assistant Examiner* — Ling R Zeng
(74) *Attorney, Agent, or Firm* — Nields, Lemack & Frame, LLC

(57) ABSTRACT

The present invention provides a method for producing a positive electrode active material for lithium ion battery, having excellent tap density, at excellent production efficiency, and a positive electrode active material for lithium ion battery. The method for producing a positive electrode active material for lithium ion battery including a step of conducting a main firing after increasing mass percent of all metals in lithium-containing carbonate by 1% to 105% compared to the mass percent of all metals before a preliminary firing, by conducting the step of a preliminary firing to the lithium-containing carbonate, which is a precursor for positive electrode active material for lithium ion battery, with a rotary kiln.

3 Claims, 1 Drawing Sheet

(51) Int. Cl.
*H01M 4/505* (2010.01)
*H01M 4/525* (2010.01)
*H01M 4/50* (2010.01)
*C01G 45/02* (2006.01)

(52) U.S. Cl.
CPC .............. *H01M 4/505* (2013.01); *H01M 4/525* (2013.01); *C01G 45/02* (2013.01); *C01P 2002/52* (2013.01); *C01P 2002/54* (2013.01); *C01P 2006/11* (2013.01); *C01P 2006/40* (2013.01); *H01M 4/50* (2013.01); *Y02E 60/122* (2013.01); *Y02P 70/54* (2015.11)

(56) References Cited

U.S. PATENT DOCUMENTS

| | | |
|---|---|---|
| 4,462,793 A | 7/1984 | Maeda et al. |
| 4,469,654 A | 9/1984 | Haskett et al. |
| 5,393,622 A | 2/1995 | Nitta et al. |
| 5,449,577 A | 9/1995 | Dahn et al. |
| 5,478,674 A | 12/1995 | Miyasaka |
| 5,759,714 A | 6/1998 | Matsufuji et al. |
| 6,037,095 A | 3/2000 | Miyasaka |
| 6,123,911 A * | 9/2000 | Yamaguchi et al. .......... 423/599 |
| 6,423,447 B1 | 7/2002 | Ohsaki et al. |
| 6,582,854 B1 | 6/2003 | Qi et al. |
| 6,984,469 B2 | 1/2006 | Kweon et al. |
| 7,332,248 B2 | 2/2008 | Kase et al. |
| 7,410,728 B1 | 8/2008 | Fujimoto et al. |
| 7,645,542 B2 | 1/2010 | Kase et al. |
| 8,354,191 B2 | 1/2013 | Shizuka et al. |
| 8,623,551 B2 | 1/2014 | Kawahashi et al. |
| 8,748,041 B2 | 6/2014 | Satoh et al. |
| 8,993,160 B2 | 3/2015 | Nagase |
| 9,090,481 B2 | 7/2015 | Satoh |
| 9,118,076 B2 | 8/2015 | Kajiya et al. |
| 2002/0106561 A1 | 8/2002 | Lee et al. |
| 2003/0082448 A1 | 5/2003 | Cho et al. |
| 2003/0104279 A1 | 6/2003 | Miyazaki et al. |
| 2003/0126803 A1 | 7/2003 | Rosenflanz |
| 2003/0211391 A1 | 11/2003 | Cho et al. |
| 2004/0053134 A1 | 3/2004 | Ozaki et al. |
| 2004/0110063 A1 | 6/2004 | Uchitomi et al. |
| 2004/0197658 A1 | 10/2004 | Kase et al. |
| 2005/0079416 A1 | 4/2005 | Ohzuku et al. |
| 2005/0142442 A1 | 6/2005 | Yuasa et al. |
| 2005/0158546 A1 | 7/2005 | Shizuka |
| 2006/0083989 A1 | 4/2006 | Suhara et al. |
| 2006/0121350 A1 | 6/2006 | Kajiya et al. |
| 2006/0127765 A1 | 6/2006 | Machida et al. |
| 2006/0204849 A1 | 9/2006 | Saito et al. |
| 2006/0233696 A1 | 10/2006 | Paulsen et al. |
| 2006/0281005 A1 | 12/2006 | Cho et al. |
| 2007/0015058 A1 | 1/2007 | Takezawa et al. |
| 2007/0141469 A1 | 6/2007 | Tokunaga et al. |
| 2007/0202405 A1 * | 8/2007 | Shizuka et al. ............. 429/231.3 |
| 2007/0248883 A1 | 10/2007 | Oda et al. |
| 2007/0298512 A1 | 12/2007 | Park et al. |
| 2008/0044736 A1 | 2/2008 | Nakura |
| 2008/0081258 A1 | 4/2008 | Kim et al. |
| 2009/0117464 A1 | 5/2009 | Cho et al. |
| 2009/0117469 A1 | 5/2009 | Hiratsuka et al. |
| 2009/0148772 A1 | 6/2009 | Kawasato et al. |
| 2009/0233176 A1 | 9/2009 | Kita et al. |
| 2009/0286164 A1 | 11/2009 | Wada et al. |
| 2009/0289218 A1 | 11/2009 | Kajiya et al. |
| 2009/0299922 A1 | 12/2009 | Malcus et al. |
| 2009/0305136 A1 | 12/2009 | Yada et al. |
| 2010/0015514 A1 | 1/2010 | Miyagi et al. |
| 2010/0019194 A1 | 1/2010 | Fujiwara et al. |
| 2010/0112447 A1 | 5/2010 | Yamamoto et al. |
| 2010/0136412 A1 | 6/2010 | Watanabe |
| 2010/0143583 A1 | 6/2010 | Honda et al. |
| 2010/0183922 A1 | 7/2010 | Cho et al. |
| 2010/0196761 A1 | 8/2010 | Tatsumi et al. |
| 2010/0209757 A1 | 8/2010 | Ooyama et al. |
| 2010/0209771 A1 | 8/2010 | Shizuka et al. |
| 2010/0227222 A1 | 9/2010 | Chang et al. |
| 2011/0031437 A1 | 2/2011 | Nagase et al. |
| 2011/0033749 A1 | 2/2011 | Uchida et al. |
| 2011/0076558 A1 | 3/2011 | Miyazaki et al. |
| 2011/0250499 A1 | 10/2011 | Hiratsuka |
| 2012/0034525 A1 | 2/2012 | Satoh et al. |
| 2012/0231342 A1 | 9/2012 | Satoh et al. |
| 2012/0231343 A1 | 9/2012 | Nagase et al. |
| 2012/0244434 A1 | 9/2012 | Nagase |
| 2012/0292562 A1 | 11/2012 | Kajiya et al. |
| 2012/0319036 A1 | 12/2012 | Kajiya et al. |
| 2012/0319039 A1 | 12/2012 | Satoh |
| 2012/0319040 A1 | 12/2012 | Okamoto et al. |
| 2012/0321956 A1 | 12/2012 | Kawahashi et al. |
| 2012/0326080 A1 | 12/2012 | Okamoto et al. |
| 2012/0326098 A1 | 12/2012 | Satoh |
| 2012/0326099 A1 | 12/2012 | Satoh |
| 2012/0326101 A1 | 12/2012 | Satoh |
| 2012/0326102 A1 | 12/2012 | Satoh |
| 2013/0001463 A1 | 1/2013 | Okamoto et al. |
| 2013/0004849 A1 | 1/2013 | Satoh |
| 2013/0043428 A1 | 2/2013 | Kawahashi et al. |
| 2013/0108921 A1 | 5/2013 | Kase et al. |
| 2013/0143121 A1 | 6/2013 | Kobayashi et al. |
| 2013/0175470 A1 | 7/2013 | Kajiya et al. |
| 2013/0221271 A1 | 8/2013 | Nagase et al. |
| 2013/0316239 A1 | 11/2013 | Okamoto |
| 2014/0306152 A1 | 10/2014 | Okamoto |
| 2014/0339465 A1 | 11/2014 | Okamoto |
| 2014/0339466 A1 | 11/2014 | Okamoto |
| 2015/0123029 A1 | 5/2015 | Nagase et al. |
| 2015/0188134 A1 | 7/2015 | Kameyama et al. |

FOREIGN PATENT DOCUMENTS

| | | |
|---|---|---|
| CN | 1710735 A | 12/2005 |
| CN | 1947288 A | 4/2007 |
| CN | 101478044 A | 7/2009 |
| EP | 0794155 A1 | 9/1997 |
| EP | 0903796 A1 | 3/1999 |
| EP | 1244164 A1 | 9/2002 |
| EP | 1317008 A2 | 6/2003 |
| EP | 1391950 A1 | 2/2004 |
| EP | 1450423 A1 | 8/2004 |
| EP | 1742281 A1 | 1/2007 |
| EP | 2023426 A1 | 2/2009 |
| EP | 2207226 A1 | 7/2010 |
| EP | 2207227 A1 | 7/2010 |
| EP | 2219546 A1 | 8/2010 |
| EP | 2533333 A1 | 12/2012 |
| EP | 2544272 A1 | 1/2013 |
| JP | 4-328277 A | 11/1992 |
| JP | 6-275274 A | 9/1994 |
| JP | 7-29603 A | 1/1995 |
| JP | 7-211311 A | 8/1995 |
| JP | 8-138669 A | 5/1996 |
| JP | 8-213015 A | 8/1996 |
| JP | 09-82325 A | 3/1997 |
| JP | 9-120813 A | 5/1997 |
| JP | 9-270257 A | 10/1997 |
| JP | 10-83815 A | 3/1998 |
| JP | 10-116618 A | 5/1998 |
| JP | 10-188986 A | 7/1998 |
| JP | 10-206322 A | 8/1998 |
| JP | 10-208744 A | 8/1998 |
| JP | 10-302779 A | 11/1998 |
| JP | 10-321224 A | 12/1998 |
| JP | 10-334919 A | 12/1998 |
| JP | 11-16573 A | 1/1999 |
| JP | 11-67205 A | 3/1999 |
| JP | 11-273676 A | 10/1999 |
| JP | 11-292542 A | 10/1999 |
| JP | 11-307094 A | 11/1999 |
| JP | 11-345615 A | 12/1999 |
| JP | 2000-30693 A | 1/2000 |
| JP | 2000-72445 A | 3/2000 |
| JP | 2000-149945 A | 5/2000 |

(56) References Cited

FOREIGN PATENT DOCUMENTS

| | | |
|---|---|---|
| JP | 2000-215884 A | 8/2000 |
| JP | 2000-348721 A | 12/2000 |
| JP | 2001-110420 A | 4/2001 |
| JP | 2001-148249 A | 5/2001 |
| JP | 2001-223008 A | 8/2001 |
| JP | 2001-266851 A | 9/2001 |
| JP | 2002-63901 A | 2/2002 |
| JP | 2002-124261 A | 4/2002 |
| JP | 3276183 B2 | 4/2002 |
| JP | 2002-164053 A | 6/2002 |
| JP | 2002-203552 A | 7/2002 |
| JP | 2002-216745 A | 8/2002 |
| JP | 2002-260655 A | 9/2002 |
| JP | 2002-289261 A | 10/2002 |
| JP | 2002-298914 A | 10/2002 |
| JP | 3334179 B2 | 10/2002 |
| JP | 2003-7299 A | 1/2003 |
| JP | 2003-17052 A | 1/2003 |
| JP | 2003-048719 A | 2/2003 |
| JP | 2003-81637 A | 3/2003 |
| JP | 2003-151546 A | 5/2003 |
| JP | 2003-229129 A | 8/2003 |
| JP | 2004-6264 A | 1/2004 |
| JP | 2004-146374 A | 5/2004 |
| JP | 2004-172109 A | 6/2004 |
| JP | 2004-193115 A | 7/2004 |
| JP | 2004-214187 A | 7/2004 |
| JP | 3539223 B2 | 7/2004 |
| JP | 2004-227790 A | 8/2004 |
| JP | 2004-253169 A | 9/2004 |
| JP | 2004-273451 A | 9/2004 |
| JP | 2004-355824 A | 12/2004 |
| JP | 2004-356094 A | 12/2004 |
| JP | 2005-11713 A | 1/2005 |
| JP | 2005-44743 A | 2/2005 |
| JP | 2005-53764 A | 3/2005 |
| JP | 2005-56602 A | 3/2005 |
| JP | 2005-60162 A | 3/2005 |
| JP | 2005-75691 A | 3/2005 |
| JP | 2005-183366 A | 7/2005 |
| JP | 2005-225734 A | 8/2005 |
| JP | 2005-235624 A | 9/2005 |
| JP | 2005-243636 A | 9/2005 |
| JP | 2005-251700 A | 9/2005 |
| JP | 2005-285572 A | 10/2005 |
| JP | 2005-289700 A | 10/2005 |
| JP | 2005-302507 A | 10/2005 |
| JP | 2005-302628 A | 10/2005 |
| JP | 2005-324973 A | 11/2005 |
| JP | 2005-327644 A | 11/2005 |
| JP | 2005-332707 A | 12/2005 |
| JP | 2005-347134 A | 12/2005 |
| JP | 2006-4724 A | 1/2006 |
| JP | 2006-19229 A | 1/2006 |
| JP | 2006-19310 A | 1/2006 |
| JP | 2006-54159 A | 2/2006 |
| JP | 2006-107818 A | 4/2006 |
| JP | 2006-107845 A | 4/2006 |
| JP | 2006-127923 A | 5/2006 |
| JP | 2006-127955 A | 5/2006 |
| JP | 2006-134816 A | 5/2006 |
| JP | 2006-134852 A | 5/2006 |
| JP | 2006-156126 A | 6/2006 |
| JP | 2006-156235 A | 6/2006 |
| JP | 2006-164758 A | 6/2006 |
| JP | 2006-286614 A | 10/2006 |
| JP | 3835266 B2 | 10/2006 |
| JP | 2006-302542 A | 11/2006 |
| JP | 2006-351379 A | 12/2006 |
| JP | 2007-48744 A | 2/2007 |
| JP | 2007-95443 A | 4/2007 |
| JP | 2007-194202 A | 8/2007 |
| JP | 2007-214138 A | 8/2007 |
| JP | 2008-181708 A | 8/2007 |
| JP | 2007-226969 A | 9/2007 |
| JP | 2007-227368 A | 9/2007 |
| JP | 2007-257890 A | 10/2007 |
| JP | 2007-280723 A | 10/2007 |
| JP | 2008-13405 A | 1/2008 |
| JP | 4070585 B2 | 4/2008 |
| JP | 2008-103132 A | 5/2008 |
| JP | 2008-192547 A | 8/2008 |
| JP | 2008-266136 A | 11/2008 |
| JP | 2008-277106 A | 11/2008 |
| JP | 2008-282613 A | 11/2008 |
| JP | 4175026 B2 | 11/2008 |
| JP | 2008-544468 A | 12/2008 |
| JP | 2009-117365 A | 5/2009 |
| JP | 2009-135070 A | 6/2009 |
| JP | 2009-151959 A | 7/2009 |
| JP | 4287901 B2 | 7/2009 |
| JP | 2009-289726 A | 12/2009 |
| JP | 2010-15959 A | 1/2010 |
| JP | 2010-47466 A | 3/2010 |
| JP | 2010-192200 A | 9/2010 |
| JP | 2011-44364 A | 3/2011 |
| JP | 2012-169224 A | 9/2012 |
| JP | 2012-243572 A | 12/2012 |
| JP | 2013-152911 A | 8/2013 |
| KR | 10-2010-0060362 A | 6/2010 |
| TW | 363940 | 7/1999 |
| WO | 02/086993 A1 | 10/2002 |
| WO | 03/003489 A1 | 1/2003 |
| WO | 2004/064180 A1 | 7/2004 |
| WO | 2007/072759 A1 | 6/2007 |
| WO | 2008/084679 A1 | 7/2008 |
| WO | 2009/011157 A1 | 1/2009 |
| WO | 2009/060603 A1 | 5/2009 |
| WO | 2009/063838 A1 | 5/2009 |
| WO | 2009/128289 A1 | 10/2009 |
| WO | 2010/049977 A1 | 5/2010 |
| WO | 2010/113512 A1 | 10/2010 |
| WO | 2010/113583 A1 | 10/2010 |
| WO | 2011/007751 A1 | 1/2011 |
| WO | 2011/065391 A1 | 6/2011 |
| WO | 2011/108720 A1 | 9/2011 |
| WO | 2011/122448 A1 | 10/2011 |
| WO | 2012/132071 A1 | 10/2012 |
| WO | 2012/132072 A1 | 10/2012 |
| WO | 2012/157143 A1 | 11/2012 |

OTHER PUBLICATIONS

International Preliminary Report on Patentability mailed Oct. 10, 2013 in co-pending PCT application No. PCT/JP2011/072860.
International Preliminary Report on Patentability mailed Aug. 1, 2013 in corresponding PCT application No. PCT/JP2011/069042.
Japanese Communication mailed Oct. 1, 2013 in co-pending Japanese patent application No. JP 2012-503253.
Japanese Communication mailed Oct. 1, 2013 in co-pending Japanese patent application No. JP 2012-503255.
Japanese Communication mailed Oct. 1, 2013 in co-pending Japanese patent application No. JP 2012-503252.
International Preliminary Report on Patentability mailed Jun. 13, 2013 in co-pending PCT application No. PCT/JP2011/066722.
International Search Report mailed Jun. 5, 2012 in co-pending PCT application No. PCT/JP2012/057974.
International Journal of Inorganic Materials 3 (2001), pp. 323-329, "Structural and electrochemical properties of Li—Ni—Co oxides synthesized by wet chemistry via a succinic-acid-assisted technique", Castro-Garcia, et al.
Office Action mailed Oct. 3, 2013 in co-pending U.S. Appl. No. 13/258,120.
Final Rejection mailed Sep. 19, 2013 in co-pending U.S. Appl. No. 13/508,887.
Office Action mailed Sep. 17, 2013 in co-pending U.S. Appl. No. 13/856,514.
International Search Report mailed Jun. 8, 2010 in co-pending PCT application No. PCT/JP2010/053443.
International Preliminary Report on Patentability mailed Nov. 17, 2011 in co-pending PCT application No. PCT/JP2010/053443.

(56) References Cited

OTHER PUBLICATIONS

International Search Report mailed May 24, 2011 in co-pending PCT application No. PCT/JP2011/053271.
International Search Report/Written Opinion mailed Mar. 8, 2011 in co-pending PCT application No. PCT/JP2010/071723.
International Preliminary Report on Patentability mailed Jul. 12, 2012 in co-pending PCT application No. PCT/JP2010/071723.
International Search Report mailed Jan. 24, 2012 in co-pending PCT application No. PCT/JP2011/072860.
International Search Report/Written Opinion mailed Jan. 25, 2011 in co-pending PCT application No. PCT/JP2010/071724.
International Preliminary Report on Patentability issued Jul. 10, 2012 in co-pending PCT application No. PCT/JP2010/071724.
International Search Report mailed Apr. 26, 2011 in co-pending PCT application No. PCT/JP2011/052394.
International Preliminary Report on Patentability mailed Oct. 11, 2012 in co-pending PCT application No. PCT/JP2011/052394.
International Search Report mailed May 10, 2011 in co-pending PCT application No. PCT/JP2011/052399.
International Preliminary Report on Patentability mailed Oct. 11, 2012 in co-pending PCT application No. PCT/JP2011/052399.
International Search Report mailed Nov. 15, 2011 in corresponding PCT application No. PCT/JP2011/069042.
International Search Report/Written Opinion mailed Jun. 7, 2011 in co-pending PCT application No. PCT/JP2011/054935.
International Preliminary Report on Patentability mailed Oct. 11, 2012 in co-pending PCT application No. PCT/JP2011/054935.
International Search Report mailed Jun. 7, 2011 in co-pending PCT application No. PCT/JP2011/054938.
International Search Report/Written Opinion mailed May 17, 2011 in co-pending PCT application No. PCT/JP2011/054942.
International Preliminary Report on Patentability issued Oct. 2, 2012 in co-pending PCT application No. PCT/JP2011/054942.
International Search Report/Written Opinion mailed Jun. 7, 2011 in co-pending PCT application No. PCT/JP2011/054934.
International Preliminary Report on Patentability mailed Oct. 11, 2012 in co-pending PCT application No. PCT/JP2011/054934.
International Search Report/Written Opinion mailed May 17, 2011 in co-pending PCT application No. PCT/JP2011/054941.
International Preliminary Report on Patentability issued Oct. 2, 2012 in co-pending PCT application No. PCT/JP2011/054941.
International Search Report mailed May 10, 2011 in co-pending PCT application No. PCT/JP2011/055111.
International Search Report/Written Opinion mailed May 17, 2011 in co-pending PCT application No. PCT/JP2011/053710.
International Preliminary Report on Patentability issued Oct. 2, 2012 in co-pending PCT application No. PCT/JP2011/053710.
International Search Report/Written Opinion mailed May 24, 2011 in co-pending PCT application No. PCT/JP2011/054777.
International Preliminary Report on Patentability issued Oct. 2, 2012 in co-pending PCT application No. PCT/JP2011/054777.
International Search Report mailed May 24, 2011 in co-pending PCT application No. PCT/JP2011/054781.
Written Opinion mailed Jun. 24, 2011 in co-pending PCT application No. PCT/JP2011/054781.
International Preliminary Report on Patentability mailed Oct. 11, 2012 in co-pending PCT application No. PCT/JP2011/054781.
International Search Report/Written Opinion mailed May 24, 2011 in co-pending PCT application No. PCT/JP2011/054779.
International Preliminary Report on Patentability issued Oct. 2, 2012 in co-pending PCT application No. PCT/JP2011/054779.
Electrochimica Acta, vol. 51, 2006, pp. 5581-5586, "Preparation and electrochemical properties of $LiCoO_2$-$LiNi0.5Mn0.5O_2$-$Li_2MnO_3$ solid solutions with high Mn contents", Sun, et al.
European communication dated Oct. 27, 2014 in co-pending European patent application No. EP 10839166.5.
European communication dated Nov. 5, 2014 in corresponding European patent application No. EP 11856183.6.
European communication dated Oct. 20, 2014 in co-pending European patent application No. EP 12763420.2.
Office Action mailed Nov. 5, 2014 in co-pending U.S. Appl. No. 13/582,087.
Office Action mailed Nov. 14, 2014 in co-pending U.S. Appl. No. 13/582,096.
International Preliminary Report on Patentability mailed Oct. 10, 2013 in co-pending PCT application No. PCT/JP0212/057974.
Office Action mailed Dec. 4, 2013 in co-pending U.S. Appl. No. 13/508,880.
Office Action mailed Dec. 18, 2013 in co-pending U.S. Appl. No. 13/514,080.
Final Rejection mailed Jan. 9, 2014 in co-pending U.S. Appl. No. 13/576,548.
Notice of Allowance mailed Nov. 6, 2013 in U.S. Appl. No. 13/582,091 (now U.S. Pat. No. 8,623,551.
European Communication dated Jan. 5, 2015 in co-pending European patent application No. 11842456.3.
European Communication dated Dec. 9, 2014 in co-pending European patent application No. 11750768.1.
European Communication dated Dec. 9, 2014 in co-pending European patent application No. 11750762.4.
European Communication dated Feb. 17, 2015 in co-pending European patent application No. 11865511.7.
Chinese Communication dated Jan. 12, 2015 in co-pending Chinese patent application No. 201280004477.6.
International Search Report mailed Jan. 7, 2014 in co-pending PCT application No. PCT/JP2013/076598.
Journal of the The Electrochemical Society, vol. 151, No. 10, Sep. 2004, pp. A1707-A1711, "Comparison of Overcharge Behavior of $AlPO_4$-Coated $LiCoO_2$ and $LiNi0.8Co0.1Mn0.1O_2$ Cathode Materials in Li-Ion Cells", Cho, et al.
Journal of Power Sources, vol. 146, 2005, pp. 39-44, "Performance of $LiNiCoO_2$ materials for advanced lithium-ion batteries", Itou, et al.
Ceramics International, vol. 35, No. 4, May 2009, pp. 1633-1639, "Fine-sized $LiNi0.8Co0.15Mn0.05O_2$ cathode particles prepared by spray pyrolysis from the polymeric precursor solutions", Ju, et al.
Journal of Alloys and Compounds, vol. 469, No. 1-2, Feb. 2009, pp. 304-309, "Effects of the ratio of manganese and nickel components on the characteristics of $Li_x(Mn_yNi_{1-y})O_z$ cathode powders prepared by spray pyrolysis", Ju, et al.
Journal of Power Sources, vol. 153, No. 2, Feb. 2006, pp. 345-349, "Improvement of 12V overcharge behavior of $LiCoO_2$ cathode material by $LiNi0.8Co0.1Mn0.1O_2$ addition in a Li-ion cell", Kim, et al.
Journal of Applied Electrochemistry, vol. 38, No. 5, Jan. 2008, pp. 613-617, "Comparative study of the preparation and electrochemical performance of $LiNi1/2Mn1/2O_2$ electrode material for rechargeable lithium batteries", Lian, et al.
Notice of Allowance mailed Jan. 15, 2015 in co-pending U.S. Appl. No. 13/514,080.
Final Rejection mailed Jan. 23, 2015 in co-pending U.S. Appl. No. 13/576,548.
Final Rejection mailed Jan. 28, 2015 in co-pending U.S. Appl. No. 13/576,753.
Final Rejection mailed Feb. 12, 2015 in co-pending U.S. Appl. No. 13/582,089.
Final Rejection mailed Feb. 13, 2015 in co-pending U.S. Appl. No. 13/582,087.
Office Action mailed Feb. 25, 2015 in co-pending U.S. Appl. No. 13/508,880.
Final Rejection mailed Feb. 24, 2015 in co-pending U.S. Appl. No. 13/695,663.
Final Rejection mailed Feb. 27, 2015 in co-pending U.S. Appl. No. 13/581,730.
Office Action mailed Feb. 26, 2015 in co-pending U.S. Appl. No. 13/582,101.
Office Action mailed Feb. 26, 2015 in co-pending U.S. Appl. No. 13/582,113.
Int. J. Electrochem. Sci., vol. 4, 2009, pp. 1770-1778, "Improved High Rate Cycling of Li-rich $Li(1.10)Ni(1/3)Co(1/3)Mn(1/3)O(2)$ Cathode for Lithium Batteries", Santhanam, et al.
Notice of Allowance mailed Mar. 20, 2014 in co-pending U.S. Appl. No. 13/258,120.
Final Rejection mailed Feb. 27, 2014 in co-pending U.S. Appl. No. 13/856,514.

(56) References Cited

OTHER PUBLICATIONS

Final Rejection mailed Jan. 27, 2014 in co-pending U.S. Appl. No. 13/581,546.
Final Rejection mailed Jan. 24, 2014 in co-pending U.S. Appl. No. 13/582,067.
Final Rejection mailed Jan. 27, 2014 in co-pending U.S. Appl. No. 13/581,814.
Final Rejection mailed Feb. 20, 2014 in co-pending U.S. Appl. No. 13/582,096.
Final Rejection mailed Feb. 7, 2014 in co-pending U.S. Appl. No. 13/582,101.
Final Rejection mailed Feb. 18, 2014 in co-pending U.S. Appl. No. 13/582,113.
Office Action mailed Jun. 10, 2013 in co-pending U.S. Appl. No. 13/508,887.
Office Action mailed Jul. 16, 2013 in co-pending U.S. Appl. No. 13/514,080.
Office Action mailed Jul. 29, 2013 in co-pending U.S. Appl. No. 13/576,548.
Office Action mailed Aug. 1, 2013 in co-pending U.S. Appl. No. 13/581,546.
Office Action mailed Jul. 17, 2013 in co-pending U.S. Appl. No. 13/581,814.
Office Action mailed Jun. 19, 2013 in co-pending U.S. Appl. No. 13/582,096.
Office Action mailed Jul. 12, 2013 in co-pending U.S. Appl. No. 13/582,101.
Office Action mailed Jul. 15, 2013 in co-pending U.S. Appl. No. 13/582,113.
Office Action mailed Aug. 13, 2013 in co-pending U.S. Appl. No. 13/582,067.
International Preliminary Report on Patentability mailed Jul. 31, 2014 in co-pending PCT application No. PCT/JP2012/074263.
International Preliminary Report on Patentability mailed Jul. 31, 2014 in co-pending PCT application No. PCT/JP2012/074266.
Journal of the Electrochemical Society, 151 (11), 2004, pp. A1899-A1904, "Synthesis, Thermal, and Electrochemical Properties of AlPO4-Coated LiNi0.8Co0.1Mn0.1O2 Cathode Materials for Li-Ion Cell", Cho, et al.
Journal of the Electrochemical Society, 155 (3), 2008, pp. A239-A245, "Storage Characteristics of LiNi0.8Co0.1+xMn0.1-x02 (x=0, 0.03, and 0.06) Cathode Materials for Lithium Ion Batteries", Eom, et al.
Machine English translation for CN 1710735 (2005), 9 pages, European Patent Office, http://translationportal.epo.org . . . , retrieved from the internet Oct. 6, 2014.
Final Rejection mailed Sep. 18, 2014 in co-pending U.S. Appl. No. 13/508,887.
Office Action mailed Sep. 18, 2014 in co-pending U.S. Appl. No. 13/856,514.
Office Action mailed Oct. 9, 2014 in co-pending U.S. Appl. No. 13/695,663.
Office Action mailed Sep. 9, 2014 in co-pending U.S. Appl. No. 13/514,080.
Office Action mailed Oct. 2, 2014 in co-pending U.S. Appl. No. 13/582,089.
Office Action mailed Oct. 3, 2014 in co-pending U.S. Appl. No. 13/581,730.
European communication issued May 9, 2014 in co-pending European patent application No. EP 11739870.1.
Chinese communication dated May 12, 2014 in co-pending Chinese patent application No. CN 201180008573.3.
European communication issued May 9, 2014 in co-pending European patent application No. EP 11750704.6.
European communication issued May 22, 2014 in co-pending European patent application No. EP 11750705.3.
European communication issued May 6, 2014 in co-pending European patent application No. EP 11845955.1.
International Search Report mailed Dec. 25, 2012 in co-pending PCT application No. PCT/JP2012/074263.
International Search Report mailed Dec. 25, 2012 in co-pending PCT application No. PCT/JP2012/074266.
International Search Report mailed Dec. 25, 2012 in co-pending PCT application No. PCT/JP2013/064941.
Final Rejection mailed Jun. 18, 2014 in co-pending U.S. Appl. No. 13/508,880.
Final Rejection mailed Jun. 3, 2014 in co-pending U.S. Appl. No. 13/514,080.
Office Action mailed Jul. 1, 2014 in co-pending U.S. Appl. No. 13/576,548.
Office Action mailed Jul. 8, 2014 in co-pending U.S. Appl. No. 13/576,753.
International Preliminary Report on Patentability mailed Nov. 22, 2012 in co-pending PCT application No. PCT/JP2011/054938.
International Preliminary Report on Patentability mailed Nov. 22, 2012 in co-pending PCT application No. PCT/JP2011/055111.
International Search Report mailed Nov. 1, 2011 in co-pending PCT application No. PCT/JP2011/066722.
International Search Report mailed Apr. 10, 2012 in co-pending PCT application No. PCT/JP2011/079535.
Office Action-Restriction-mailed Mar. 12, 2013 in co-pending U.S. Appl. No. 13/508,887.
Office Action mailed Mar. 13, 2013 in co-pending U.S. Appl. No. 13/582,091.
Final Rejection mailed Jul. 29, 2015 in co-pending U.S. Appl. No. 13/508,880.
Office Action mailed Jun. 4, 2015 in co-pending U.S. Appl. No. 13/695,663.
Notice of Allowance mailed Jun. 30, 2015 in co-pending U.S. Appl. No. 13/576,548.
Notice of Allowance mailed May 20, 2015 in co-pending U.S. Appl. No. 13/582,087.
Final Rejection mailed Jun. 23, 2015 in co-pending U.S. Appl. No. 13/582,096.
Final Rejection mailed Jul. 1, 2015 in co-pending U.S. Appl. No. 13/582,101.
Final Rejection mailed Jun. 30, 2015 in co-pending U.S. Appl. No. 13/582,113.
Final Rejection mailed Jun. 24, 2015 in co-pending U.S. Appl. No. 13/816,822.
Japanese communication mailed Apr. 7, 2015 in co-pending Japanese patent application No. 2012-503258.
International Preliminary Report on Patentability mailed Mar. 19, 2015 in co-pending PCT application No. PCT/JP2013/064941.
International Preliminary Report on Patentability mailed Apr. 2, 2015 in co-pending PCT application No. PCT/JP2013/076598.
Wikipedia, Karl Fischer Titration article, Waybackmachine.com snapshot dtd., Sep. 12, 2010, 2 pages.
Office Action mailed Mar. 18, 2015 in co-pending U.S. Appl. No. 13/816,822.
Office Action mailed Apr. 3, 2015 in co-pending U.S. Appl. No. 13/822,447.
Office Action mailed Apr. 23, 2015 in co-pending U.S. Appl. No. 14/364,795.
Office Action mailed Apr. 3, 2015 in co-pending U.S. Appl. No. 14/364,809.
Office Action mailed Apr. 3, 2015 in co-pending U.S. Appl. No. 14/364,830.
Office Action mailed May 14, 2015 in co-pending U.S. Appl. No. 13/984,947.
European communication issued Aug. 5, 2015 in co-pending European patent application No. EP 11750707.9.
Yamada, et al., "Synthesis and properties of LiNiO2 as cathode material for secondary batteries", Journal of Power Sources, vol. 54, No. 2, Apr. 1, 1995, pp. 209-213.
Whittingham, Stanley M., "Lithium Batteries and Cathode Materials", Chem. Rev. 2004, 104, 4271-4301.
Notice of Allowance mailed Aug. 26, 2015 in co-pending U.S. Appl. No. 13/695,663.
Notice of Allowance mailed Sep. 10, 2015 in co-pending U.S. Appl. No. 13/576,753.

(56) References Cited

OTHER PUBLICATIONS

Notice of Allowance mailed Sep. 22, 2015 in co-pending U.S. Appl. No. 13/582,096.
Notice of Allowance mailed Oct. 22, 2015 in co-pending U.S. Appl. No. 13/582,101.
Notice of Allowance mailed Oct. 22, 2015 in co-pending U.S. Appl. No. 13/582,113.
Office action mailed Sep. 29, 2015 in co-pending U.S. Appl. No. 13/816,822.
Final rejection mailed Aug. 14, 2015 in co-pending U.S. Appl. No. 13/822,447.
Notice of Allowance mailed Oct. 21, 2015 in co-pending U.S. Appl. No. 13/984,947.
Notice of Allowance mailed Sep. 8, 2015 in co-pending U.S. Appl. No. 14/364,795.
Notice of Allowance mailed Sep. 10, 2015 in co-pending U.S. Appl. No. 14/364,809.
Office action mailed Sep. 8, 2015 in co-pending U.S. Appl. No. 14/364,830.

* cited by examiner

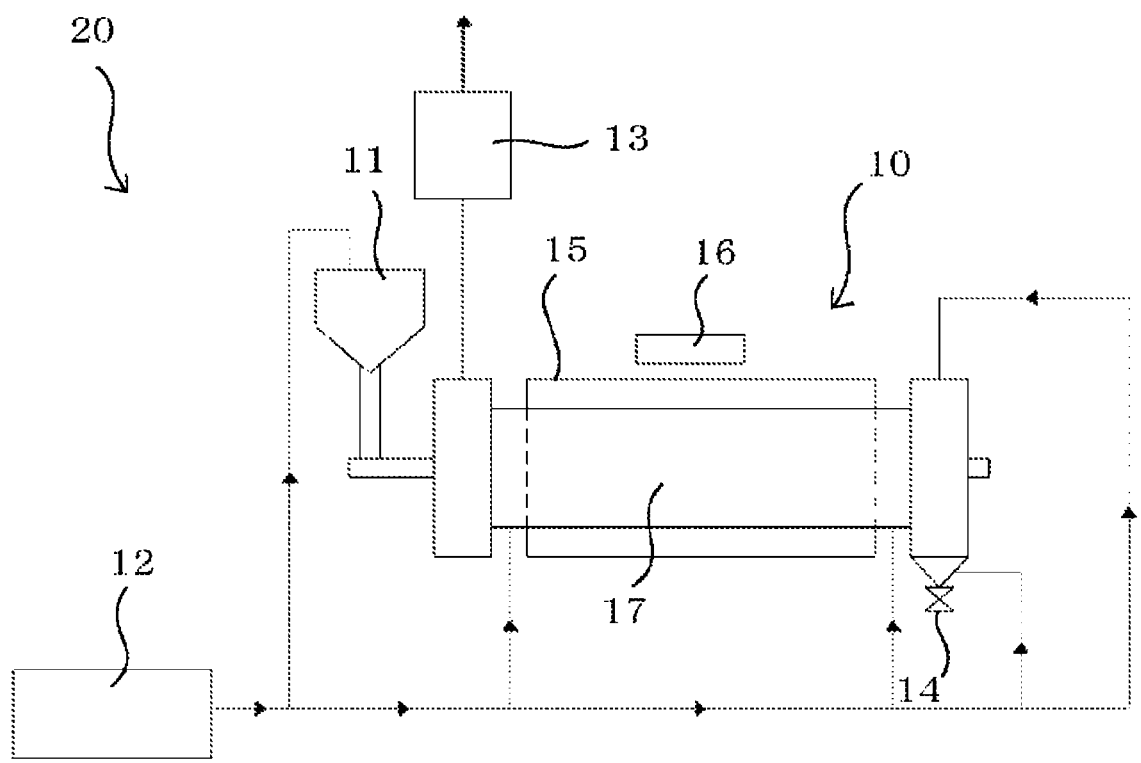

METHOD FOR PRODUCING POSITIVE ELECTRODE ACTIVE MATERIAL FOR LITHIUM ION BATTERY AND POSITIVE ELECTRODE ACTIVE MATERIAL FOR LITHIUM ION BATTERY

TECHNICAL FIELD OF THE INVENTION

The present invention relates to a method for producing a positive electrode active material for lithium ion battery and a positive electrode active material for lithium ion battery.

BACKGROUND OF THE INVENTION

As a positive electrode active material for lithium ion battery, a lithium transition metal composite oxide is well known. The lithium transition metal composite oxide is produced as described, for example, in Patent document 1 in such a manner that a lithium compound and a transition metal compound are mixed to prepare a precursor for positive electrode active material for lithium ion battery and, after that, the mixture is fired to form a composite.

A lithium ion battery is, from the uses thereof, used over a long period of time, and, because charge and discharge are repeated, various kinds of characteristics such as the cycle characteristics and storage characteristics are required, and high capacity of very high level is being demanded. Further, as a market for lithium battery for use in consumer equipments such as portable telephones and personal computers and for use in automobiles expands, it is demanded to produce lithium ion battery at low cost and with high efficiency.

In a step of producing lithium ion battery like this, as was described above, it is necessary to fire a precursor for positive electrode active material for lithium ion battery to form a composite. In such a step of firing, generally, a method where a firing vessel in which the precursor is filled is disposed inside of a firing furnace (static furnace) and heated according to a conveyer method or a batch method is in use. In the case of conducting the firing by using the static furnace, a large amount of precursor can be fired relatively efficiently by sending the firing vessel in which a large amount of the precursor is filled into the furnace in sequence.

(Patent documents 1) Japanese Patent No. 3334179

SUMMARY OF THE INVENTION

However, before firing, a precursor for positive electrode active material for lithium ion battery has a large amount of gas such as carbon dioxide, nitrogen oxide and the like, and water. Accordingly, when the precursor is sent into the static furnace and a firing treatment starts, gas and water are firstly released. Therefore, if the precursor is filled up in the firing vessel, it is only a part remaining after gases or water is released from the precursor firstly filled in the firing vessel to be fired and become a complex substantially. In fact, this is only about 45% to about 50% of the amount of the filled precursor, and therefore, there is a problem with the object of producing the lithium ion battery efficiently. Further, in the present technical field, in addition to producing efficiently, it is also an important object to improve properties of the produced precursor for positive electrode active material for lithium ion battery and the battery using thereof simultaneously.

The present invention intends to provide a method for producing a positive electrode active material for lithium ion battery, having excellent tap density, at excellent production efficiency, and a positive electrode active material for lithium ion battery.

The present inventors have found, after studying hard that, in the step of firing a precursor for positive electrode active material for lithium ion battery, excellent production efficiency, excellent tap density of the precursor can be provided and improved properties of the battery using the precursor can be provided by introducing a step of conducting a preliminary firing with a rotary kiln before a step of conducting a main firing, removing water and gases by firing the precursor in the step of conducting a preliminary firing with the rotary kiln and then increasing metal ratio in the precursor, and making a complex by the step of conducting a main firing after granulating of the precursor.

The invention completed based on the above findings is, in an aspect, a method for producing a positive electrode active material for lithium ion battery including a step of conducting a main firing after increasing mass percent of all metals in lithium-containing carbonate by 1% to 105% compared to the mass percent of all metals before a preliminary firing, by conducting the step of a preliminary firing to the lithium-containing carbonate, which is a precursor for positive electrode active material for lithium ion battery, with a rotary kiln.

In an embodiment of the method for producing a positive electrode active material for lithium ion battery, the mass percent of all metals in lithium-containing carbonate is increased by 50% to 97% by conducting the step of a preliminary firing.

In another embodiment of the method for producing a positive electrode active material for lithium ion battery, the preliminary firing is conducted at 400° C. to 1200° C. for 30 minutes to 120 minutes.

In still another embodiment of the method for producing a positive electrode active material for lithium ion battery, the main firing is conducted at 700° C. to 1100° C. for 3 hours to 72 hours with a furnace using a firing vessel.

In another embodiment of the method for producing a positive electrode active material for lithium ion battery, the positive electrode active material is represented by a compositional formula: $Li_xNi_{1-y}M_yO_{2+\alpha}$ (In the formula, M is one or more kinds selected from Sc, Ti, V, Cr, Mn, Fe, Co, Cu, Zn, Ga, Ge, Al, Bi, Sn, Mg, Ca, B and Zr, $0.9 \leq x \leq 1.2$, $0 < y \leq 0.7$, and $0.05 \leq \alpha$).

In still another embodiment of the method for producing a positive electrode active material for lithium ion battery, M is one or more kinds selected from Mn and Co.

The present invention is, in another aspect, a positive electrode active material for lithium ion battery, being represented by a compositional formula: $Li_xNi_{1-y}M_yO_{2+\alpha}$ (In the formula, M is one or more kinds selected from Sc, Ti, V, Cr, Mn, Fe, Co, Cu, Zn, Ga, Ge, Al, Bi, Sn, Mg, Ca, B and Zr, $0.9 \leq x \leq 1.2$, $0 < y \leq 0.7$, and $0.05 \leq \alpha$) and having the tap density of 1.8 to 2.2 g/cc.

In one embodiment of the positive electrode active material for lithium ion battery of the present invention, M is one or more kinds selected from Mn and Co.

The present invention is, in still another aspect, a positive electrode for lithium ion battery using the positive electrode active material for lithium ion battery of the present invention.

The present invention is, in still another aspect, a lithium ion battery using the positive electrode for lithium ion battery of the present invention.

ADVANTAGEOUS EFFECT OF THE INVENTION

The present invention can provide a method for producing a positive electrode active material for lithium ion battery, having excellent tap density, at excellent production efficiency, and a positive electrode active material for lithium ion battery.

BRIEF DESCRIPTION OF THE DRAWINGS

FIG. 1 is a pattern diagram of a preliminary firing equipment.

DESCRIPTION OF THE PREFERRED EMBODIMENTS

[Constitution of Positive Electrode Active Material for Lithium Ion Battery]

As a raw material of positive electrode active material for lithium ion battery produced in the invention, compounds useful as a general positive electrode active material for positive electrodes for lithium ion battery can be broadly used.

However, in particular, lithium-containing transition metal oxides such as lithium cobalt oxide ($LiCoO_2$), lithium nickel oxide ($LiNiO_2$) and lithium manganese oxide ($LiMn_2O_4$) can be preferably used. The positive electrode active material for lithium ion battery produced with the materials described above is represented by, for example, a compositional formula: $Li_xNi_{1-y}M_yO_{2+\alpha}$ (In the formula, M is one or more kinds selected from Sc, Ti, V, Cr, Mn, Fe, Co, Cu, Zn, Ga, Ge, Al, Bi, Sn, Mg, Ca, B and Zr, $0.9 \leq x \leq 1.2$, $0 < y \leq 0.7$, and $0.05 \leq \alpha$).

A ratio of lithium to all metals in the positive electrode active material for lithium ion battery is 0.9 to 1.2. This is because when the ratio is less than 0.9, a stable crystal structure is difficult to maintain, and when the ratio is more than 1.2, the capacity becomes low.

In the positive electrode active material for lithium ion battery of the invention, oxygen is excessively contained as shown as $O_{2+\alpha}$ (and $0.05 \leq \alpha$) in the above compositional formula. When the positive electrode active material is used in lithium ion battery, battery characteristics such as capacity, rate characteristics and capacity retention rate become excellent. Here, the α is preferably larger than 0.15, more preferably larger than 0.20, and typically $0.05 \leq \alpha \leq 0.25$.

Further, in the compositional formula of the positive electrode active material for lithium ion battery of the invention, M is preferable to be one or more kinds selected from Mn and Co.

Further, the tap density of the positive electrode active material for lithium ion battery of the invention is 1.8 g/cc to 2.2 g/cc. When the positive electrode active material is used in lithium ion battery, battery characteristics such as capacity, rate characteristics and capacity retention rate become excellent. So far, when lithium-containing carbonate that is a precursor is fired only in a static furnace, since the precursor is sparse between particles, it was difficult to improve the tap density. According to the present invention, by preliminary firing of the lithium-containing carbonate that is a precursor while flowing in the rotary kiln, particles are granulated with each other to be dense, thereby the tap density is improved.

[Constitution of Positive Electrode for Lithium Ion Battery and Lithium Ion Battery Using Thereof]

The positive electrode for lithium ion battery of the present invention has a constitution, for example, where a mixture of the positive electrode active material for lithium ion battery, having the aforesaid constitution, conductive material and binder, is applied on one surface or both surfaces of a current collector made of aluminum foil and the like. The lithium ion battery of the embodiment of the present invention has the positive electrode for lithium ion battery having the aforesaid constitution.

[Method for Producing Positive Electrode Active Material for Lithium Ion Battery]

Next, a method for producing a positive electrode active material for lithium ion battery related to an embodiment of the invention will be described in detail.

Firstly, a metal salt solution is prepared. The metal is Ni, and one or more kinds selected from Sc, Ti, V, Cr, Mn, Fe, Co, Cu, Zn, Ga, Ge, Al, Bi, Sn, Mg, Ca, B and Zr. Further, the metal salt is sulfate, chloride, nitrate or acetate, and the nitrate is particularly preferable. This is because even when the nitrate is mixed in a firing raw material as an impurity, it can be fired as it is to result in dispensing with the step of washing, and the nitrate works as an oxidizing agent to promote oxidation of metals in the firing raw material. Each of the metals contained in the metal salt is adjusted to be a desired molar ratio. Thereby, a molar ratio of each of the metals in the positive electrode active material is determined.

Next, lithium carbonate is suspended in pure water, after that, a metal salt solution of the metal is poured therein to prepare a slurry of lithium salt solution. At this time, fine particulate lithium-containing carbonate is segregated in the slurry. When the lithium compound does not react during heating sulfate or chloride as the metal salt, the lithium compound is, after washing with a saturated solution of lithium carbonate, filtered off. When, like nitrate or acetate, the lithium compound thereof reacts as a lithium raw material during heat treatment, it is, without washing, filtered off as it is, and dried, thereby it can be used as a fired precursor.

Then, the filtered lithium-containing carbonate is dried, powder of a composite of lithium salt (precursor for positive electrode active material for lithium ion battery) is obtained. The precursor for positive electrode active material for lithium ion battery contains totally 20 mass % to 40 mass % of lithium, nickel, manganese, cobalt and the like as a metal.

[Step of Conducting a Preliminary Firing]

Next, a preliminary firing equipment 20 such as shown in FIG. 1 is prepared. The preliminary firing equipment 20 includes a rotary kiln 10, a powder feeder 11, a gas feeder 12, a bag filter 13 and a preliminary fired body exhauster 14. The rotary kiln 10 includes a furnace core tube 17, an external cylinder 15 formed by surrounding the furnace core tube 17, and a heater 16 that is set outside of the external cylinder 15 and heats the furnace core tube 17. The furnace core tube 17 is formed with predetermined inner diameter and length depending on an amount of the precursor to be preliminarily fired and a preliminary firing time. For example, the furnace core tube 17 having the inner diameter of 125 mm to 3500 mm and a total length of 1 m to 30 m can be used. Stirring blades (not shown in FIGURE), for stirring powder to be preliminarily fired, may be formed so as to erect from a surface of the inside wall of the furnace core tube 17. The furnace core tube 17 is preferably formed of a material that excellently conducts heat from the heater 16 and does not generate a contaminating substance that may mingle with the precursor. For example, Ni, Ti, stainless or ceramic can be used to form. Also the external cylinder 15 is preferably formed of a material that excellently conducts heat from the heater 16, for example, Ni, Ti, stainless or ceramic can be used to form. The heater 16 is not particularly restricted in its position as long as the position is outside of the external cylinder 15. Further, in FIG. 1, the heater 16 is set at one position.

However, the heater 16 may be set at a plurality of positions. The rotary kiln 10 inclines so as to come down from an anterior part to a posterior part. Thereby, the precursor charged from the anterior part moves backward during firing. An angle of inclination is not particularly restricted and can be determined depending on a preliminary firing time.

In a precursor feeder 11, a precursor to be preliminarily fired is set inside thereof. The precursor feeder 11 is connected to an anterior part of the rotary kiln 10 and therefrom the precursor is fed to the anterior part.

The preliminary fired body exhauster 14 is set at a posterior part of the rotary kiln 10. From the preliminary fired body exhauster 14, powder (preliminary fired body) preliminarily fired by going through the furnace core tube 17 is exhausted.

The gas feeder 12 feeds a gas that circulates inside of a preliminary firing equipment 20. From the gas feeder 12, an inert gas such as nitrogen or argon, and oxygen are fed. A pathway shown with an arrow mark in FIG. 1 is a circulation pathway of gas fed from the gas feeder 12.

The bag filter 13 is set at an anterior part of the rotary kiln 10. The bag filter 13 recovers the precursor mingled in an exhaust gas. The bag filter 13 uses a woven-fabric or non-woven fabric as a filtering material and is formed by superposing these cylindrically.

As the step of conducting a preliminary firing, firstly, while rotating the furnace core tube 17, the heater 16 is used to start heating. Here, depending on the preliminary firing time and preliminary firing temperature to a mass of a precursor for a positive electrode active material for lithium ion battery to be fed later, an angle of inclination and a rotating speed of the furnace core tube 17 are determined. For example, when a mass of the precursor is 20 g to 110 g, the preliminary firing time is 30 minutes to 120 minutes, and the preliminary firing temperature is 400° C. to 1200° C., the angle of inclination of the furnace core tube 17 can be set at 8° to 15° and the rotating speed can be set at 3.6 rad/sec to 9.6 rad/sec. When the preliminary firing is conducted at below 400° C., a problem that gas component cannot be removed sufficiently is caused because of an insufficient reaction. Further, when the preliminary firing is conducted at over 1200° C., a problem that a reaction between lithium and a material of the furnace is developed is caused.

Next, when the temperature inside of the furnace core tube 17 goes up to 400° C. to 1200° C., a precursor for positive electrode active material for lithium ion battery is fed from the precursor feeder 11 to the anterior part of the furnace core tube 17. The fed precursor for positive electrode active material for lithium ion battery is, while being stirred and heated inside of the rotating furnace core tube 17, transported to the posterior part of the furnace core tube 17. In this way, the preliminary firing of the precursor is conducted. During this time, gas such as carbon dioxide, nitrogen oxide and the like and water are released from the precursor for a positive electrode active material for lithium ion battery, and mass percent of all metals in the precursor increases by 1% to 105%, preferably 50% to 97%, compared to the mass percent before the preliminary firing. Further, by conducting the preliminary firing with the rotary kiln, water and gas are removed as described above, and then mass percent of all metals in the precursor increases and the precursor is granulated. Then, the tap density of the precursor becomes excellent. Specifically, by flowing the precursor with the rotary kiln, roughness of a surface of particles, caused by degassing and dewatering, can be uniformized and the density can be improved, and further, by granulating, voids generated between the particles can be vanished and then the density of the particles can be improved. Therefore, properties of the battery using such a precursor are improved. On the other hand, if the precursor is fired by conducting only the main firing, without conducting the preliminary firing with the rotary kiln, a surface of the particles of the precursor gets rough and a lot of air holes are generated when gas and water are removed from the precursor, and then the tap density becomes low. Therefore, porous preliminary fired powder is generated, and then the tap density is low even after the main firing. Accordingly, excellent properties of the battery become difficult to provide.

Further, during the preliminary firing, powder of the precursor and the like exhausted from the furnace core tube 17 together with a feed gas is recovered with a bag filter 13. The precursor recovered by the bag filter 13, after purification, may be used as a raw material again.

Next, the precursor fired preliminarily is exhausted from the preliminary fired body exhauster 14 to outside of the equipment. Thereafter, the following main firing is conducted.

[Step of Conducting a Main Firing]

Firstly, a firing vessel having a predetermined size is prepared and powder of the precursor for a positive electrode active material for lithium ion battery is filled in the firing vessel. Materials for forming the firing vessel are not limited particularly, but the firing vessel is preferably formed of a material that excellently conducts heat from the heater and does not generate a contaminating substance that may mingle with the precursor. For example, Ni, Ti, stainless or ceramic can be used to form. The powder of the precursor for a positive electrode active material for lithium ion battery, after conducting the preliminary firing, is filled in such a firing vessel. At this time, as the preliminary firing is conducted to the precursor, the precursor filled in the firing vessel is a precursor that gas component and water are released from. Accordingly, when the heating with the main firing is started, a volume of the precursor in the firing vessel does not decrease sharply due to the release of gas and water. Therefore, the precursor to be mainly fired can be filled in the firing vessel efficiently and the amount of the precursor that can be mainly fired in the firing furnace at one time increases. Therefore, production efficiency can be excellent.

Next, the firing vessel in which the powder of the precursor is filled is transferred to the firing vessel and then the main firing is conducted. A heater is set in the firing vessel and the powder of the precursor is heated by the heater.

The firing is conducted under atmospheric pressure, preferably under oxygen atmosphere, with being maintained at 700° C. to 1100° C. for 3 hours to 72 hours. When the heating and maintaining of the main firing are conducted at below 700° C., a problem that the tap density of the produced positive electrode active material becomes low and the discharge capacity, the rate characteristics and the capacity retention rate of the battery property become low is caused. On the other hand, when the heating and maintaining of the main firing are conducted at over 1100° C., a problem that Li sublimates and the discharge capacity, the rate characteristics and the capacity retention rate of the battery property become low is caused. Further, it is preferable to conduct the firing under increased pressure of 101 KPa to 202 KPa because the amount of oxygen in the composition increases further.

After that, the powder is taken from the firing vessel and crushed, and then the powder of the positive electrode active material is provided.

EXAMPLES

In what follows, examples will be provided to promote better understanding of the invention and advantages thereof. However, the invention is not restricted to the examples.

Working Examples 1 to 16

Firstly, lithium carbonate of a charging amount described in Table 1 was suspended in 3.2 L of pure water, thereafter, 4.8

L of a solution of metal salts was poured therein. Here, the solution of metal salts was prepared in such a manner that hydrates of nitrate of the respective metals were adjusted so that the respective metals had a composition ratio described in Table 1 and a total mole number of the metals was 14 moles.

An amount of lithium carbonate suspension is an amount where x is a value of Table 1 when a product (a positive electrode active material for lithium ion secondary battery, that is, a positive electrode active material) is represented by $Li_xNi_{1-y}M_yO_{2+\alpha}$, and each thereof was calculated according to the following equation.

$$W(g)=73.9\times14\times(1+0.5X)\times A$$

In the equation, "A" is a numerical value multiplied to subtract in advance, in addition to an amount of necessary as a precipitation reaction, an amount of lithium due to the lithium compound other than lithium carbonate remaining in the raw material after filtration, from a suspension amount. The "A" is 0.9 when a lithium salt reacts as a firing raw material like nitrate and acetate, and 1.0 when a lithium salt does not react as the firing raw material like sulfate and chloride.

According to the treatment, microparticulate lithium-containing carbonate precipitated in the solution and the precipitate was filtered off by using a filter press.

Subsequently, the precipitate was dried, thereby a lithium-containing carbonate (precursor for positive electrode active material for lithium ion battery) was obtained. In this time, a concentration of all metals in the precursor was 29 mass % to 33 mass %.

Next, a preliminary firing equipment as shown in FIG. 1 was prepared by using a rotary kiln (manufactured by Takasago Industry Co., Ltd., furnace core tube: length 2000 mm×inner diameter 250 mm). With oxygen circulating from a gas feeder into a system, a heater was used to start heating, and the rotary kiln was rotated at a rotating speed of 9.6 rad/sec. The angle of inclination of the rotary kiln was set at 10°. When the temperature inside of the furnace core tube became 700° C., with the temperature maintained, the precursor was charged from the precursor feeder into the furnace core tube. A charging amount of the precursor was set at 110 g/min. The precursor charged into the furnace core tube was preliminarily fired by stirring and transporting in the rotating furnace core tube, and then gases and water were released therefrom. The preliminarily fired precursor was exhausted from the preliminary firing body exhauster to outside of the equipment. A concentration of all metals in the exhausted precursor was 54 mass % to 58 mass %.

Next, a ceramic firing vessel, having the internal size of 300 mm×300 mm in width and depth and of 115 mm in height, was prepared, and then lithium-containing carbonate was filled in the firing vessel. Next, the firing vessel was set in an air atmosphere furnace (static furnace), and then the main firing was started with a heater. A main firing time was 6 hours to 12 hours and the main firing temperature was 700° C. to 1100° C. In this way, samples in the firing vessel were heated and kept at the maintaining temperature of 700° C. to 1100° C. for 2 hours, and then the samples were allowed to cool for 3 hours and oxides were provided. Next, the provided oxides were crushed, and then powder of the positive electrode active material for lithium ion secondary battery was provided.

Working Example 17

As working example 17, except that the respective metals of raw material were set to a composition shown in Table 1, the metal salts were selected from chlorides thereof, and after the precipitation of the lithium-containing carbonate, the precipitate was washed with a saturated solution of lithium carbonate and filtered, the same treatment as that of Examples 1 to 16 was conducted.

Working Example 18

As working example 18, except that the respective metals of raw material were set to a composition shown in Table 1, the metal salts were selected from sulfates thereof, and after the precipitation of the lithium-containing carbonate, the precipitate was washed with a saturated solution of lithium carbonate and filtered, the same treatment as that of Examples 1 to 16 was conducted.

Working Example 19

As working example 19, except that the respective metals of raw material were set to a composition shown in Table 1 and the firing was conducted not under atmospheric pressure but under increased pressure of 120 KPa, the same treatment as that of Examples 1 to 16 was conducted.

Comparative Examples 1 to 5

As comparative examples 1 to 3, except that the respective metals of raw material were set to a composition shown in Table 1 and the preliminary firing was not conducted, the same treatment as that of Examples 1 to 16 was conducted.

As comparative example 4, except that the respective metals of raw material were set to a composition shown in Table 1 and the preliminary firing was conducted at low temperature (100° C.), the same treatment as that of Examples 1 to 16 was conducted.

As comparative example 5, except that "the preliminary firing time x the preliminary firing temperature" was "120 minutes×1000° C." which was larger than those of working examples, the same treatment as that of Examples 1 to 16 was conducted.

[Evaluation]

Evaluation of composition of positive electrode materials:

Contents of metals in each of positive electrode materials were measured with an inductively-coupled plasma optical emission spectrometer (ICP-OES) and the composition ratio (molar ratio) of the respective metals was calculated. Further, a content of oxygen was measured by LECO method and a was calculated.

Evaluation of mass percent of all metals in lithium-containing carbonate (before preliminary firing and after preliminary firing):

Lithium-containing carbonate before the preliminary firing and lithium-containing carbonate after the preliminary firing were respectively sampled, and then contents of each metal were measured with an inductively-coupled plasma optical emission spectrometer (ICP-OES) and mass percent of all metals was calculated.

Evaluation of properties of battery:

Each of the positive electrode materials, a conductive material and a binder was weighed at a ratio of 85:8:7. In a solution obtained by dissolving the binder in an organic solvent (N-methyl pyrrolidone), the positive electrode material and conductive material were mixed to form a slurry. The slurry was coated on an aluminum foil and, after drying, pressed to form a positive electrode. Then, a 2032 coin cell for use in evaluation, in which Li is used as a counter electrode was prepared, and, with a solution obtained by dissolving 1 M-LiPF$_6$ in EC-DMC (1:1) as an electrolytic solution, the discharge capacity when a current density is 0.2 C was measured. Further, a ratio of discharge capacity under the current density of 2 C to the battery capacity when the current density is 0.2 C was calculated and thereby the rate characteristics were obtained. Further, the capacity retention rate was measured by comparing the initial discharge capacity obtained under a discharge current of 1 C at room temperature to the discharge capacity after 100 cycles.

The evaluation results of working examples and comparative examples are shown in Tables 1 and 2.

TABLE 1

| | suspension amount of lithium carbonate (g) | composition ratio of each metal in all metals except Li | | | | | | | | | maintaining temperature (° C.) | x | α | preliminary firing time (min) | preliminary firing temperature (° C.) |
| | | Ni | Co | Mn | Ti | Cr | Fe | Cu | Al | Sn | Mg | | | | | |
|---|---|---|---|---|---|---|---|---|---|---|---|---|---|---|---|---|
| working example 1 | 1396.7 | 33.3 | 33.3 | 33.3 | | | | | | | | 1030 | 1.0 | 0.16 | 45 | 700 |
| working example 2 | 1396.7 | 33.3 | 33.3 | 33.3 | | | | | | | | 1050 | 1.0 | 0.13 | 60 | 700 |
| working example 3 | 1396.7 | 33.3 | 33.3 | 33.3 | | | | | | | | 1070 | 1.0 | 0.11 | 30 | 700 |
| working example 4 | 1396.7 | 33.3 | 33.3 | 33.3 | | | | | | | | 1050 | 1.0 | 0.13 | 30 | 200 |
| working example 5 | 1443.3 | 33.3 | 33.3 | 33.3 | | | | | | | | 1100 | 1.1 | 0.07 | 30 | 1200 |
| working example 6 | 1350.2 | 33.3 | 33.3 | 33.3 | | | | | | | | 1050 | 0.9 | 0.11 | 120 | 400 |
| working example 7 | 1489.8 | 33.3 | 33.3 | 33.3 | | | | | | | | 1050 | 1.2 | 0.19 | 60 | 700 |
| working example 8 | 1396.7 | 65 | 20 | 15 | | | | | | | | 980 | 1.0 | 0.07 | 120 | 700 |
| working example 9 | 1396.7 | 80 | 10 | 10 | | | | | | | | 750 | 1.0 | 0.06 | 60 | 900 |
| working example 10 | 1396.7 | 33 | 33 | 33 | | | | | | | 1 | 1050 | 1.0 | 0.13 | 120 | 700 |
| working example 11 | 1396.7 | 80 | 15 | | 5 | | | | | | | 700 | 1.0 | 0.06 | 30 | 900 |
| working example 12 | 1396.7 | 80 | 15 | | | 5 | | | | | | 700 | 1.0 | 0.17 | 120 | 900 |
| working example 13 | 1396.7 | 80 | 15 | | | | 5 | | | | | 710 | 1.0 | 0.05 | 60 | 800 |
| working example 14 | 1396.7 | 80 | 15 | | | | | 5 | | | | 750 | 1.0 | 0.07 | 60 | 900 |
| working example 15 | 1396.7 | 80 | 15 | | | | | | 5 | | | 740 | 1.0 | 0.06 | 60 | 800 |
| working example 16 | 1396.7 | 80 | 15 | | | | | | | 5 | | 720 | 1.0 | 0.06 | 60 | 800 |
| working example 17 | 1551.9 | 33.3 | 33.3 | 33.3 | | | | | | | | 1050 | 1.0 | 0.09 | 30 | 1000 |
| working example 18 | 1551.9 | 33.3 | 33.3 | 33.3 | | | | | | | | 1050 | 1.0 | 0.08 | 60 | 800 |
| working example 19 | 1396.7 | 33.3 | 33.3 | 33.3 | | | | | | | | 1050 | 1.0 | 0.24 | 60 | 700 |
| comparative example 1 | 1396.7 | 33.3 | 33.3 | 33.3 | | | | | | | | 1000 | 1.0 | 0.20 | — | — |
| comparative example 2 | 1396.7 | 33.3 | 33.3 | 33.3 | | | | | | | | 950 | 1.0 | 0.22 | — | — |
| comparative example 3 | 1396.7 | 33.3 | 33.3 | 33.3 | | | | | | | | 1050 | 1.0 | 0.17 | — | — |
| comparative example 4 | 1396.7 | 33.3 | 33.3 | 33.3 | | | | | | | | 1050 | 1.0 | 0.13 | 30 | 100 |
| comparative example 5 | 1396.7 | 80 | 15 | | | | | 5 | | | | 740 | 1.0 | 0.04 | 120 | 1000 |

TABLE 2

| | A: mass percent of all metals in lithium-containing carbonate (before preliminary firing) | B: mass percent of all metals in lithium-containing carbonate (after preliminary firing) | increasing ratio of B to A (%) | main firing time (hour) | main firing temperature (° C.) | tap density (g/cc) | discharge capacity (mAh/g) | rate characteristics (%) | capacity retention rate (%) |
|---|---|---|---|---|---|---|---|---|---|
| working example 1 | 30 | 56 | 85 | 12 | 1030 | 1.8 | 155 | 92 | 90 |
| working example 2 | 30 | 57 | 87 | 12 | 1050 | 2.0 | 155 | 92 | 89 |
| working example 3 | 30 | 52 | 70 | 12 | 1070 | 2.1 | 154 | 91 | 89 |
| working example 4 | 30 | 31 | 3 | 12 | 1050 | 1.8 | 155 | 91 | 90 |
| working example 5 | 31 | 63 | 102 | 6 | 1100 | 2.2 | 151 | 89 | 85 |
| working example 6 | 29 | 39 | 36 | 6 | 1050 | 1.9 | 152 | 90 | 87 |
| working example 7 | 32 | 57 | 81 | 9 | 1050 | 2.1 | 156 | 93 | 91 |
| working example 8 | 29 | 57 | 96 | 24 | 980 | 2.1 | 171 | 89 | 86 |
| working example 9 | 30 | 59 | 96 | 72 | 750 | 1.8 | 185 | 85 | 82 |
| working example 10 | 30 | 58 | 94 | 12 | 1050 | 2.0 | 154 | 91 | 88 |
| working example 11 | 30 | 59 | 96 | 72 | 700 | 1.8 | 187 | 85 | 82 |
| working example 12 | 29 | 60 | 104 | 72 | 700 | 1.8 | 186 | 84 | 81 |
| working example 13 | 30 | 55 | 85 | 72 | 710 | 1.8 | 180 | 84 | 80 |
| working example 14 | 30 | 58 | 93 | 48 | 750 | 2.1 | 181 | 84 | 81 |
| working example 15 | 30 | 58 | 96 | 48 | 740 | 1.9 | 191 | 89 | 82 |
| working example 16 | 33 | 59 | 81 | 48 | 720 | 1.8 | 183 | 85 | 82 |
| working example 17 | 30 | 61 | 102 | 12 | 1050 | 1.8 | 151 | 87 | 85 |
| working example 18 | 30 | 60 | 98 | 12 | 1050 | 1.8 | 152 | 86 | 86 |
| working example 19 | 30 | 57 | 87 | 12 | 1050 | 2.2 | 159 | 94 | 91 |
| comparative example 1 | 30 | — | — | 12 | 1000 | 1.4 | 149 | 88 | 83 |
| comparative example 2 | 30 | — | — | 12 | 950 | 1.3 | 149 | 87 | 82 |
| comparative example 3 | 30 | — | — | 12 | 1050 | 1.7 | 151 | 88 | 83 |
| comparative example 4 | 30 | 30.15 | 0.5 | 12 | 1050 | 1.8 | 152 | 89 | 85 |
| comparative example 5 | 30 | 62 | 109 | 48 | 740 | 1.7 | 177 | 82 | 78 |

The compositions of the positive electrode materials of working examples and comparative examples were just as shown in Table 1.

In all of working examples 1 to 16, all of the tap density, the discharge capacity, the rate characteristics and the capacity retention were excellent.

Also, in working examples 17 and 18, all of the tap density, the discharge capacity, the rate characteristics and the capacity retention were excellent. However, chloride was used as the metal salt of the raw material in working example 17, and sulfate was used as the metal salt of the raw material in working example 18. Accordingly, in comparison with working examples 1 to 16 where the nitrate was used as the metal salt of the raw material, the discharge capacity, the rate characteristics and the capacity retention were slightly poorer.

In working example 19, in particular, the tap density, the rate characteristics and the capacity retention were more excellent because the firing was conducted not under atmospheric pressure but under increased pressure of 120 KPa.

In comparative example 4, the preliminary firing was conducted, but the temperature of the firing was low. Therefore, an increasing ratio of mass percent of all metals in the lithium-containing carbonate after the preliminary firing was 0.5% and a granulating level was low. Though they were not poor results, various properties were inferior to those of working example 4 produced in the same condition except the preliminary firing temperature.

In comparative example 5, "preliminary firing time×preliminary firing temperature" was larger than that of working examples and excess preliminary firing was conducted. Therefore, in particular, the tap density and the capacity retention were poor.

EXPLANATION OF REFERENCE NUMBERS

10 rotary kiln
11 precursor feeder
12 gas feeder
13 bag filter
14 preliminary fired body exhauster
15 external cylinder
16 heater
17 furnace core tube
20 preliminary firing equipment

What is claimed is:

1. A method for producing a positive electrode active material for lithium ion battery comprising:
    conducting a preliminary firing of a precursor containing lithium-containing carbonate, which is a precursor for positive electrode active material for lithium ion battery, with a rotary kiln, to generate a preliminary fired material, wherein the preliminary firing increases mass percent of all metals in the precursor containing lithium-containing carbonate by 50% to 97% compared to the mass percent of all metals before the preliminary firing; and
    conducting a main firing of only the preliminary fired material.

2. The method for producing a positive electrode active material for lithium ion battery of claim 1, wherein the positive electrode active material is represented by a compositional formula: $Li_xNi_{1-y}M_yO_{2+\alpha}$ (In the formula, M is one or more kinds selected from Sc, Ti, V, Cr, Mn, Fe, Co, Cu, Zn, Ga, Ge, Al, Bi, Sn, Mg, Ca, B and Zr, $0.9 \leq x \leq 1.2$, $0 < y \leq 0.7$, and $0.05 \leq \alpha$).

3. The method for producing a positive electrode active material for lithium ion battery of claim 2, wherein M is one or more kinds selected from Mn and Co.

* * * * *